(12) United States Patent
Miwa et al.

(10) Patent No.: US 8,417,887 B2
(45) Date of Patent: Apr. 9, 2013

(54) STORAGE SYSTEM AND METHOD FOR CONTROLLING ATTRIBUTES SUCH AS ENCRYPTION ATTRIBUTES IN VIRTUAL STORAGE AREAS

(75) Inventors: Kyoko Miwa, Kawasaki (JP); Nobuyuki Osaki, Yokohama (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/526,780

(22) PCT Filed: Mar. 31, 2009

(86) PCT No.: PCT/JP2009/001483
§ 371 (c)(1),
(2), (4) Date: Aug. 11, 2009

(87) PCT Pub. No.: WO2010/113207
PCT Pub. Date: Oct. 7, 2010

(65) Prior Publication Data
US 2011/0307658 A1    Dec. 15, 2011

(51) Int. Cl.
*G06F 12/08*    (2006.01)
*G06F 12/00*    (2006.01)
(52) U.S. Cl.
USPC .......................................................... 711/114
(58) Field of Classification Search ............ 711/114
See application file for complete search history.

(56) References Cited

U.S. PATENT DOCUMENTS

| 2006/0143418 | A1 | 6/2006 | Takahashi et al. |
| 2007/0113007 | A1 | 5/2007 | Murayama et al. |
| 2007/0300079 | A1 | 12/2007 | Osaki |
| 2008/0126813 | A1* | 5/2008 | Kawakami ................ 713/193 |
| 2008/0240441 | A1* | 10/2008 | Kawakami ................ 380/277 |
| 2008/0263306 | A1 | 10/2008 | Tanizawa |
| 2009/0043982 | A1 | 2/2009 | Kano et al. |
| 2009/0049236 | A1* | 2/2009 | Kinoshita ................ 711/112 |
| 2009/0271638 | A1* | 10/2009 | Kawakami et al. ........ 713/193 |

FOREIGN PATENT DOCUMENTS

| JP | 2003-15915 | 1/2003 |
| JP | 2005-0303981 | 10/2005 |
| WO | WO 2008/037741 A1 | 4/2008 |

OTHER PUBLICATIONS

U.S. Appl. No. 12/153,114, filed May 14, 2008.

* cited by examiner

*Primary Examiner* — Sanjiv Shah
*Assistant Examiner* — Glenn Gossage
(74) *Attorney, Agent, or Firm* — Foley & Lardner LLP

(57) ABSTRACT

A storage system for controlling attributes for data stored in virtual storage areas includes a logical storage area management unit 1140 that manages the linking of virtual storage areas and attributes such as encryption attributes to logical storage area groups. When receiving a command to change an attribute of a virtual storage area or virtual volume, the logical storage area management unit determines the presence or absence of a unit logical storage area in a logical storage area group or pool linked to a different attribute and that is not yet allocated to a virtual storage area. The logical storage area management unit links a unit logical storage area determined to be present to a virtual storage area, reads data stored in the unit logical storage area linked to a virtual storage area subjected to an attribute change, and stores the read data in accordance with the different attribute.

9 Claims, 21 Drawing Sheets

PARITY GROUP MANAGEMENT TABLE 1141

| PARITY GROUP# (11411) | DISK# (11412) | RAID LEVEL (11413) | ENCRYPTION ATTRIBUTE (11414) | KEY (11415) | ENCRYPTION METHOD (11416) |
|---|---|---|---|---|---|
| 1 | 1, 2, 3, 4 | 5 | PLAIN TEXT | | |
| 2 | 5, 6, 7, 8 | 5 | CIPHER | 0x1234 5678 | AES-CBC-256 |
| ... | ... | ... | ... | ... | ... |

FIG. 6

EXTERNAL VOLUME GROUP MANAGEMENT TABLE 1142

| EXTERNAL VOLUME GROUP# (11421) | WWN (11422) | LUN (11423) | ENCRYPTION ATTRIBUTE (11424) | KEY (11425) | ENCRYPTION METHOD (11426) |
|---|---|---|---|---|---|
| 1 | 12:34:56: 78:9a:bc | 1 | CIPHER | 0x987 65432 | AES-ECB-256 |
| 2 | 98:75:54: 32:1c:ba | 2 | PLAIN TEXT | | |
| ... | ... | ... | ... | ... | ... |

FIG. 7

LDEV MANAGEMENT TABLE 1143

| PARITY GROUP# | LDEV# | START ADDRESS | END ADDRESS |
|---|---|---|---|
| 1 | 1 | 1 | 200 |
| 1 | 2 | 201 | 400 |
| ... | ... | ... | ... |
| 2 | 15 | 1 | 200 |
| 2 | 16 | 201 | 400 |
| ... | ... | ... | ... |

Columns: 11431, 11432, 11433, 11434

FIG. 8

EXTERNAL LDEV MANAGEMENT TABLE 1144

| EXTERNAL VOLUME GROUP# | LDEV# | START ADDRESS | END ADDRESS |
|---|---|---|---|
| 1 | 101 | 1 | 200 |
| 1 | 102 | 201 | 400 |
| ... | ... | ... | ... |
| 2 | 115 | 1 | 200 |
| 2 | 116 | 201 | 400 |
| ... | ... | ... | ... |

Columns: 11441, 11442, 11443, 11444

FIG. 9

LU MANAGEMENT TABLE 1145

| VIRTUAL VOLUME# | WWN | LUN | CAPACITY | POOL# |
|---|---|---|---|---|
| 1 | 01:23:45:67:89 | 0 | 10G | 1 |
| 2 | 09:87:65:43:21 | 1 | 20G | 1 |
| ... | ... | ... | ... | ... |

FIG. 10

POOL MANAGEMENT TABLE 1146

| POOL# | LDEV# | POOL CAPACITY | POOL USE RATIO | ENCRYPTION ATTRIBUTE | ENCRYPTION METHOD |
|---|---|---|---|---|---|
| 1 | 100, 110, 120, 130 | 200G | 40% | CIPHER | AES-CBC-256 |
| 2 | 200, 210, 220, 230 | 150G | 28% | PLAIN TEXT | |
| 3 | 300, 310, 320, 330 | 200G | 20% | CIPHER | AES-ECB-256 |
| ... | ... | ... | ... | ... | ... |

FIG. 11

ALLOCATED BLOCK MANAGEMENT TABLE 1147

| LUN | START ADDRESS | END ADDRESS | LDEV # | START ADDRESS | END ADDRESS |
|---|---|---|---|---|---|
| 1 | 1 | 10 | 100 | 1 | 10 |
| 1 | 11 | 20 | 110 | 1 | 10 |
| ... | ... | ... | ... | ... | ... |
| 2 | 1 | 10 | 200 | 1 | 10 |
| ... | ... | ... | ... | ... | ... |

FIG. 12

UNALLOCATED BLOCK MANAGEMENT TABLE 1148

| POOL# | LDEV# | START ADDRESS | END ADDRESS |
|---|---|---|---|
| 1 | 100 | 11 | 200 |
| 1 | 110 | 11 | 200 |
| ... | ... | ... | ... |
| 2 | 200 | 1 | 200 |
| 2 | 200 | 211 | 280 |

FIG. 13

SCHEDULED-TO-BE-DELETED BLOCK MANAGEMENT TABLE 1149

| POOL# | LDEV# | START ADDRESS | END ADDRESS |
|---|---|---|---|
| 1 | 100 | 41 | 50 |
| 1 | 100 | 61 | 70 |
| ... | ... | ... | ... |
| 2 | 200 | 11 | 20 |

FIG. 14

TO-BE-ENCRYPTED VOLUME SELECTION SCREEN

PLAIN TEXT VOLUME LIST

| CHECK BOX | VIRTUAL VOLUME# | VIRTUAL VOLUME CAPACITY | POOL# | ENCRYPTION ATTRIBUTE |
|---|---|---|---|---|
| ✓ | 1 | 10G | 1 | PLAIN TEXT |
|  | 2 | 20G | 1 | PLAIN TEXT |
| ✓ | 3 | 20G | 1 | PLAIN TEXT |
| ✓ | 4 | 100G | 1 | PLAIN TEXT |
| ... | ... |  | ... | ... |

[ OK ]  [ CANCEL ]

FIGURE 19A

STORAGE SYSTEM AND METHOD FOR CONTROLLING ATTRIBUTES SUCH AS ENCRYPTION ATTRIBUTES IN VIRTUAL STORAGE AREAS

TECHNICAL FIELD

The present invention relates to a storage system and a method of operating the storage system, and, more particularly, to a storage system and a method of operating the storage system that simply and appropriately control an attribute representing a storing state of to-be-stored data for each virtual unit storage area to simplify management configuration.

BACKGROUND ART

A technique is known for dynamically extending a storage area provided to an external apparatus, such as a host computer. For example, a so-called "thin provisioning" technique is described in Japanese Patent Application Laid-Open Publication No. 2003-15915.

According to the thin provisioning technique described in Japanese Patent Application Laid-Open Publication No. 2003-15915, a host computer is provided with a virtual volume that is a virtual storage area of a storage apparatus communicatively coupled to the host computer. In addition, the storage apparatus has a pool area prepared thereto. The pool area is a group of logical devices that are logical storage areas (hereinafter "LDEV" or "logical volume"), and each LDEV is configured with a multiplicity of logical blocks (hereinafter "block") that are unit storage areas.

When receiving a data write request from the host computer, the storage apparatus allocates an unallocated block among blocks included in the pool area to a virtual volume.

The above storage apparatus may be configured so that a plurality of virtual volumes share the same pool area. In this case, each of the plurality of blocks belonging to the same pool area is allocated to a different virtual volume, respectively.

A need to keep data stored in the storage apparatus in an encrypted state may arise from the viewpoint of data security. For example, Japanese Patent Application Laid-Open Publication No. 2005-303981 discloses a storage apparatus that has a function of encrypting to-be-stored data to ensure the security of data stored in the storage apparatus.

DISCLOSURE OF INVENTION

Technical Problem

In a storage apparatus having a configuration enabling thin provisioning for dynamically extending a storage area, a need may arise of specifying encrypting or not encrypting data to be stored in the storage apparatus not in units of virtual volumes but in units of physical storage areas, such as in units of parity groups. In this case, to encrypt all data written to a certain virtual volume, only the block belonging to a physical storage area that is given an instruction to be encrypted must be allocated to the virtual volume.

To achieve this, a pool area as the source of block allocation is specified for each virtual volume, and when data to be stored in a virtual volume is encrypted, a pool area configured with LDEVs including only the blocks to be encrypted (hereinafter "encryption LDEV") is specified for the virtual volume.

Presume the case where only the data stored in some of a plurality of virtual volumes is encrypted when the plurality of virtual volumes share a pool configured with LDEVs, where the LDEVs include only the blocks that are not to be encrypted (hereinafter "plain text LDEV"). To encrypt data stored in a virtual volume, a pool area configured with only the encryption LDEVs must be used. Therefore even in a case where a part of the virtual volumes are to be encrypted, all the LDEVs configuring the pool area shared by the virtual volumes must be encrypted. This poses a problem that even when only some of the virtual volumes are to be encrypted, other virtual volumes sharing the same pool area must also be encrypted.

A configuration so to manage an encrypted state in units of blocks to solve the above problem leads to a complicated management, thus ending up in an unrealistic solution. This problem applies to attributes in general that are to be set in units of physical storage areas with respect to data storing states including the above encrypted state.

An object of the present invention is to provide a storage system and a method of operating the storage system that simply and appropriately control an attribute representing a storing state of to-be-stored data for each of a plurality of virtual unit storage areas to simplify management configuration.

Technical Solution

In order to solve the above and other problems, an aspect of the present invention provides a storage system comprising a storage apparatus having a storage control unit communicatively coupled to an external apparatus, forming a plurality of virtual storage areas each serving as a unit storage area used by the external apparatus as a data storing area, using a unit logical storage area selected among a plurality of unit logical storage areas provided by a physical storage medium, linking to each of the virtual storage areas, and any one of a plurality of attributes each representing a stored state of data stored in the virtual storage area, and maintaining the link wherein the storage control unit further includes a logical storage area management unit that manages the link of the virtual storage area and any one of the attributes to each of logical storage area groups each configured to include the unit logical storage area to maintain the link and manage the linking relation, wherein the logical storage area management unit, when receiving a command to change an attribute of any one of the virtual storage areas to a different attribute, determines presence or absence of the unit logical storage area that belongs to the logical storage area group linked to the changed different attribute and that is not yet allocated to any one of the virtual storage areas, and when determining the presence of the unit logical storage area that is not yet allocated to any one of the virtual storage areas, the logical storage area management unit links the unit logical storage area determined to be present to the virtual storage area, reads out data stored in the unit logical storage area linked to a virtual storage area subjected to the attribute change, and stores the read data in the unit logical storage area determined to be present in accordance with a storage state represented by the different attribute.

Advantageous Effects

According to the present invention there is provided a storage system and a method of operating the storage system that simply and appropriately control an attribute representing a storing state of to-be-stored data for each of a plurality of virtual unit memory areas to simplify a management configuration.

BRIEF DESCRIPTION OF DRAWINGS

FIG. 6 is a diagram of an example of a parity group management table 1141.

FIG. 7 is a diagram of an example of an external volume group management table.

FIG. 8 is a diagram of an example of an LDEV management table.

FIG. 9 is a diagram of an example of an external LDEV management table.

FIG. 10 is a diagram of an example of an LU management table.

FIG. 11 is a diagram of an example of a pool management table.

FIG. 12 is a diagram of an example of an allocated block management table.

FIG. 13 is a diagram of an example of an unallocated block management table.

FIG. 14 is a diagram of an example of a scheduled-to-be-deleted block management table.

FIG. 19A is a diagram of an example of a management screen that can be displayed on the management computer.

EMBODIMENTS OF INVENTION

The present invention will now be described based on an embodiment thereof with reference to the accompanying drawings.

<Schematic Configuration of Storage System 1 of the Present Embodiment>

Figure 1:
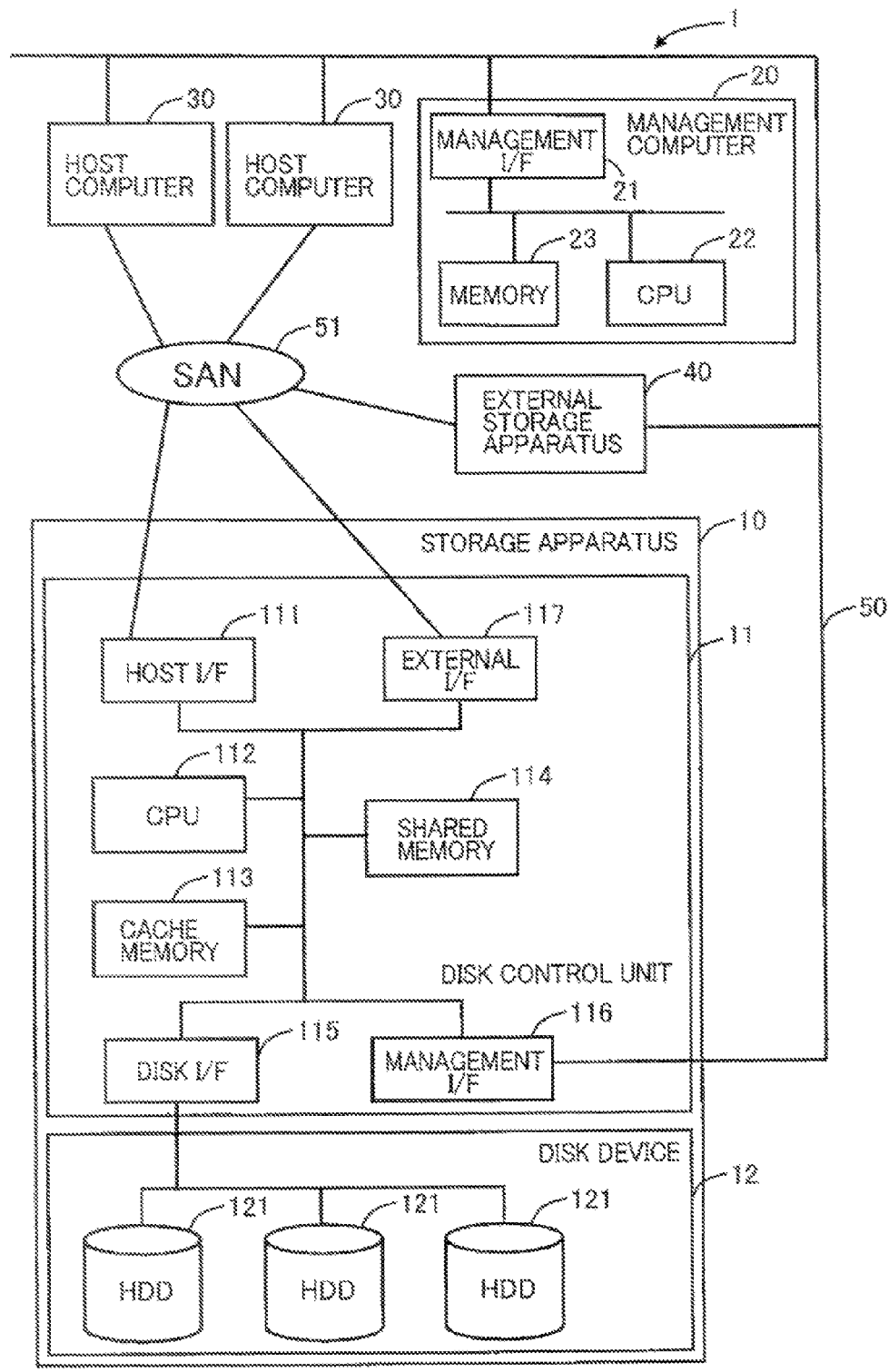
FIG. 1 is a diagram of a schematic configuration of storage system 1 according to one embodiment of the present invention.

FIG. 1 is a diagram showing a schematic configuration of storage system 1 according to one embodiment of the present invention.

As shown in FIG. 1, the storage system 1 is configured to include one or more host computers (external apparatus) 30, one or more storage apparatuses 10, and an external storage apparatus 40 that are coupled communicatively to each other via a storage area network (SAN) 51. The storage system 1 also includes a management computer 20 that is coupled communicatively to the storage apparatus 10 and to the external storage apparatus 40 via a management network 50. The external storage apparatus 40, which will be described later, is not a constituent element essential to the present invention.

The storage network 51 is a communication network that is used mainly for I/O-access-based communication between the host computer 30 and the storage apparatus 10. The storage network 51 is used also for I/O-access-based communication between the storage apparatus 10 and the external storage apparatus 40.

Such a network as SAN (Storage Area Network) and LAN (Local Area Network) can be adopted as the storage network 51, which is typically configured as a redundant system including a plurality of network switches, hubs, etc. In this embodiment, the storage network 51 is composed of a fiber channel SAN (FC-SAN) based on the fiber channel (hereinafter "FC") protocol.

The management network 50 is a communication network that communicatively interconnects the management computer 20, the host computer 30, the storage apparatus 10, and the external storage apparatus 40. The management network 50 is used for communication that is carried when the management computer 20 manages the host computer 30, the storage apparatus 10, and the external storage apparatus 40. In this embodiment, the management network 50 is composed of a LAN based on the Internet protocol (hereinafter "IP").

(Host Computer 30)

The host computer 30 is a computer that executes, for example, an application program used for a business system in a bank, a seat reservation service system in an airline company, etc.

Figure 2:
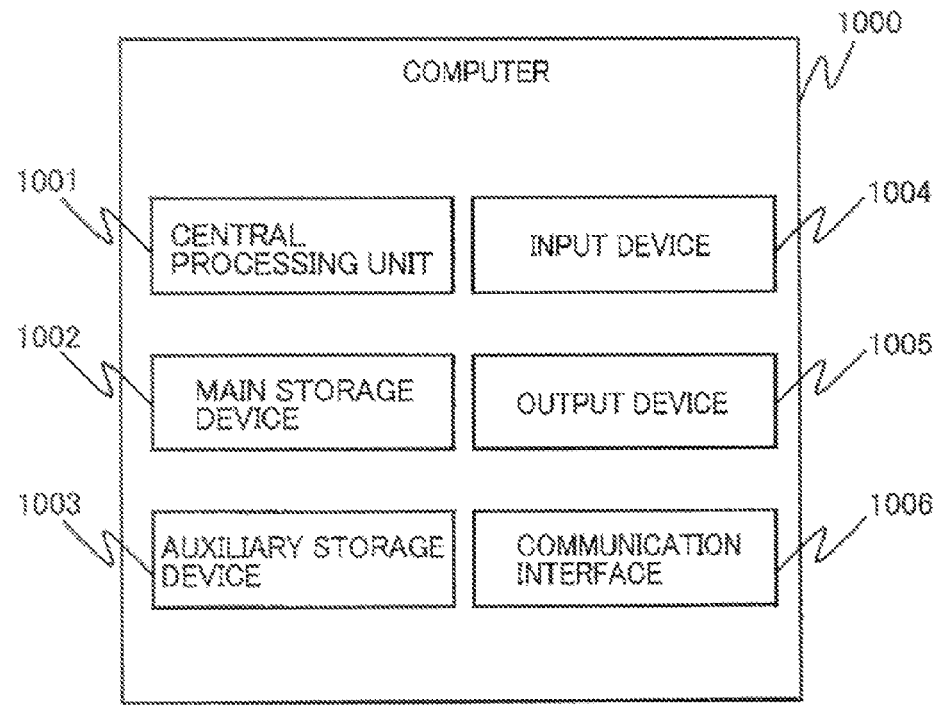
FIG. 2 is a diagram of an example of a hardware configuration of a computer that can be used as a management computer 20 and as a host computer 30.

FIG. 2 depicts an example of a hardware configuration of a computer 1000 that can be used as the host computer 30 and as the management computer 20 to be described later. The computer 1000 has a central processing unit 1001 (e.g., CPU (Central Processing Unit), MPU (Micro Processing Unit), etc., which will hereinafter be referred to as "CPU" for simplicity), a main storage device 1002 (e.g., RAM (Random Access Memory), ROM (Read-Only Memory), etc.), an auxiliary storage device 1003 (e.g., hard disc drive (hereinafter "HDD")), an input device 1400 (e.g., keyboard, mouse, etc.) that receives user input, an output device 1005 (e.g., liquid crystal display monitor), and a communication interface 1006 (e.g., NIC (Network Interface Card), HBA (Host Bus Adaptor), etc.) that realizes communication of the computer 1000 with another apparatus.

Figure 3:
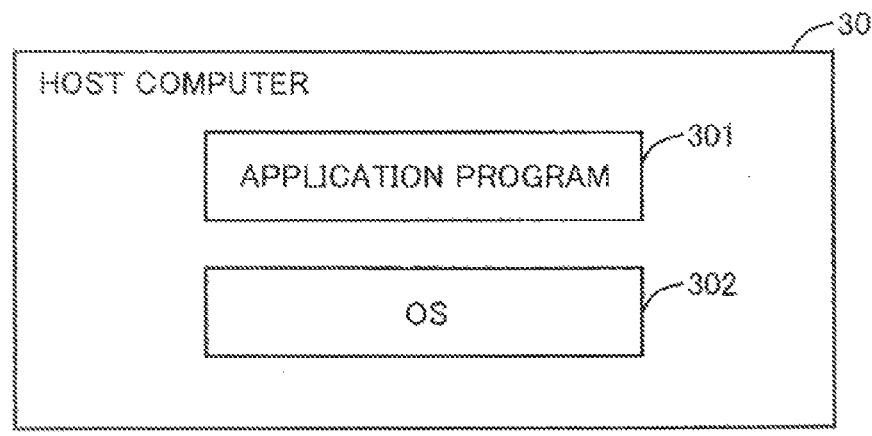
FIG. 3 is a diagram of an example of a software configuration of the host computer 30.

FIG. 3 depicts an example of a software configuration of the host computer 30. The host computer 30 has software resources including an operating system (hereinafter "OS") 302 that provides a basic function as a computer, such as data I/O processing, and an application program 301 that runs on the OS 302. The host computer 30 thus executes the application program 301 varying in type under control by the CPU 1001 to realize desired processing through cooperation with other hardware resources.

Typically, in the process of executing an application program on an OS under control by the CPU, the host computer 30 accesses data stored in the storage apparatus 10 and the external storage apparatus 40, which will be described later, to realize desired business processing.

(Storage Apparatus 10)

The storage apparatus 10 is a subsystem that provides the host computer 30 with a storage area for storing data. As shown in FIG. 1, the storage apparatus 10 can be provided as, for example, an appropriate type of an RAID (Redundant Array of Independent (or Inexpensive) Disks) system including disk arrays having a plurality of HDDs (physical storage medium) 121. The HDD 121 may be replaced with another storage medium, such as a SSD (Solid State Drive).

The storage apparatus 10 includes a disk device 12, and a disk control unit 11 that executes data I/O processing between the host computer 30, data I/O processing between the HDD 121, and data I/O processing between the external storage apparatus 40.

The disk control unit 11 has a host interface (hereinafter "I/F" or "IF") 111, a CPU 112, a cache memory (hereinafter "CM") 113, a shared memory (hereinafter "SM") 114, a disk IF 115, a management IF 116, and an external IF 117.

The host IF 111 is a communication interface that is provided for enabling communication between the host computer 30 and the storage apparatus 10. In this embodiment, the host IF 111 serves as a channel adaptor (hereinafter "CHA") coupled to the storage network 51 that is an FC network.

The CM 113 provides a storage area for temporarily storing therein data written to or read from the HDD 121.

The SM 114 has stored therein, for example, a program for controlling data I/O to/from the storage apparatus 10 and various management tables used for the control. The SM 114 has also stored therein a control program for executing a data encryption control process in this embodiment and management tables used by the control programs.

Figure 4A:
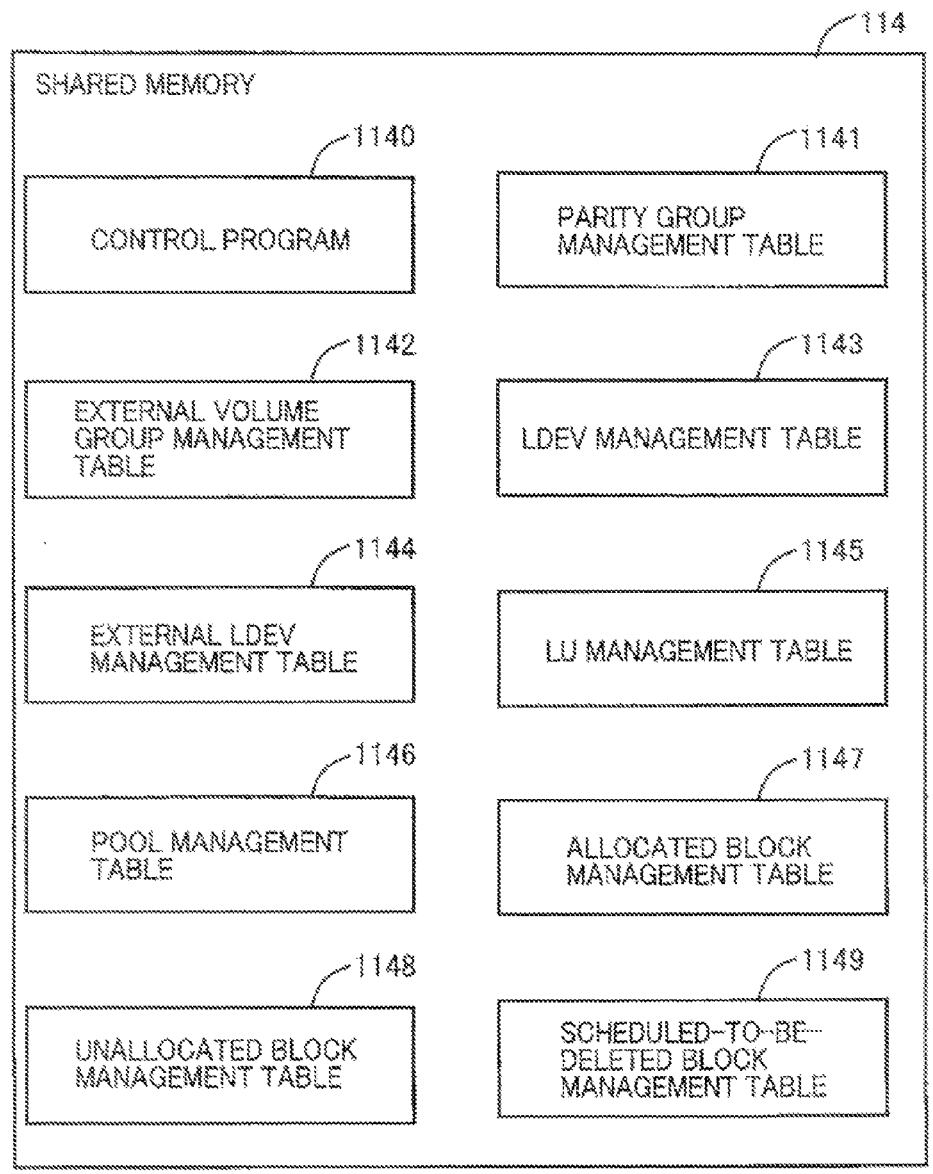
FIG. 4A is a diagram of an example of a configuration of a shared memory 114 of a storage apparatus 10.
Figure 4B:
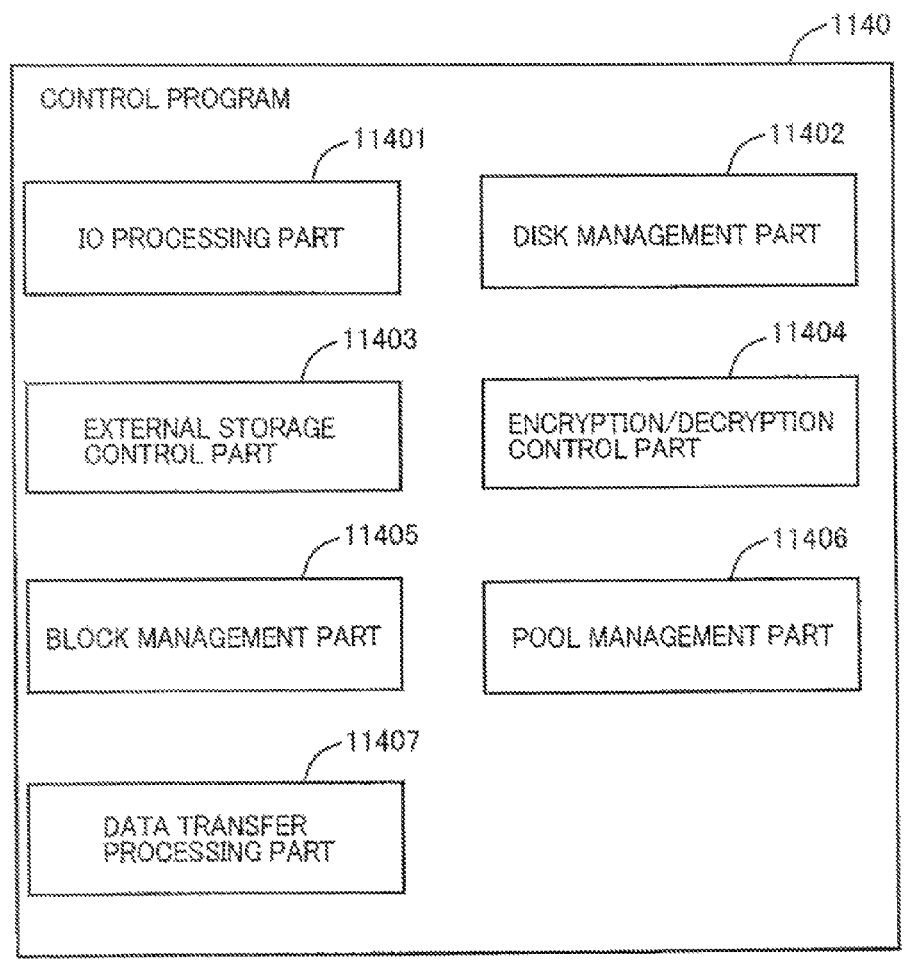
FIG. 4B is a diagram of an example of a configuration of a control program 1140 stored in the shared memory 114.

FIGS. 4A and 4B depict an example of a configuration of the SM 114. The SM 114 has a control program 1140 functioning as a logical storage area management part, and management tables 1141 to 1149. The control program 1140 has various types of function parts for controlling the storage apparatus 10, the function parts including an I/O processing part 11401 that processes I/O access from the host computer 30, a disk management part 11402 that controls I/O access to the disk device 12, an external storage control part 11403 that controls I/O access to the external storage apparatus, a encryption/decryption control part 11404 that encrypts and decrypts data to be stored in the HDD 121, a block management part 11405 that carries out block allocation and cancels block allocation to a virtual volume, a pool management part 11406 that manages a pool serving as a logical memory area group, and a data transfer processing part 11407 that encrypts plain text data already stored therein or decrypts encrypted data.

The block management part 11405 and the pool management part 11406 have a thin provisioning function of controlling block allocation to a virtual volume. The CPU 112 of the disk control unit 11 executes the control program 1140 to realize each of the above functions.

Referring again to FIG. 4A, the SM 114 has stored therein a parity group management table 1141, an external volume group management table 1142, an LDEV management table 1143, an external LDEV management table 1144, a logical unit (LU) management table 1145, a pool management table 1146, an allocated block management table 1147, an unallocated block management table 1148, and a scheduled-to-be-deleted block management table 1149. Details of the tables will be described later with reference to the drawings related to the tables.

The disk I/F 115 (FIG. 1) is a disk adaptor (hereinafter "DKA") serving as a communication interface that is provided to enable communication between the disk control unit 11 and the disk device 12.

The management I/F 116 is a communication interface that is provided to enable communication between the disk control unit 11 and the management computer 20. In this embodiment, the management I/F 116 is an NIC for connection to a LAN.

The external I/F 117 is a communication interface that is provided to enable communication between the storage apparatus 10 and the external storage apparatus 40. In this embodiment, the external I/F 117 is provided as a CHA coupled to the SAN, similar to the host I/F 111.

(External Storage Apparatus 40)

The external storage apparatus 40 has the same hardware configuration as that of the storage apparatus 10 that has been described above with reference to FIG. 1. The external storage apparatus 40 is capable of linking its logical volume to an external volume that is a virtual volume created in the external storage apparatus 40 by the storage apparatus 10. Through this linking, the logical volume of the external storage apparatus 40 is taken into the storage apparatus 10. And with an external connection technique, the logical volume taken in is regarded as a logical volume belonging to the storage apparatus 10. Thereby, the logical storage area is provided to the host computer 30 as storage resources incorporated in the storage apparatus 10.

(Management Computer 20)

The management computer 20 is a computer for managing the storage apparatus 10, and typically a general-purpose computer is used therefor. As shown in FIG. 1, the management computer 20 has hardware resources including a CPU 22, a memory 23, a management I/F 21 and the like.

Figure 5:
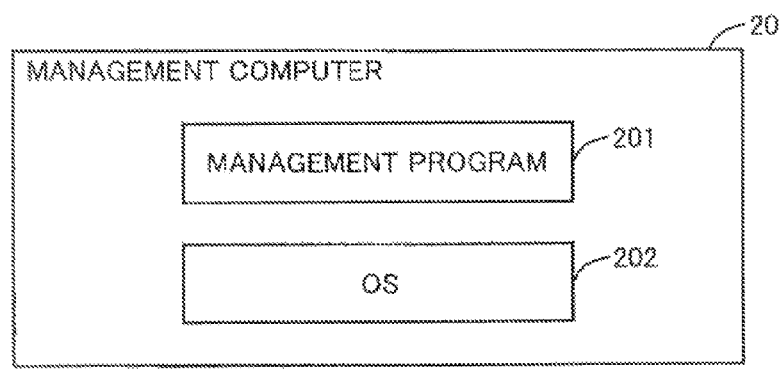
FIG. 5 is a diagram of an example of a software configuration of the management computer 20.

FIG. 5 depicts an example of a software configuration of the management computer 20. The management computer 20 executes a management program 201 on an OS 202 under control of the CPU to provide a storage administrator with a user interface for managing the storage apparatus 10 and the external storage apparatus 40. In response to an input operation by the storage administrator, the management computer 20 carries out management of the storage system 1, such as by providing instructions to execute setting and processing on the storage apparatus 10 and the external storage apparatus 40 and monitoring the operation status of the storage apparatus 10 and the external storage apparatus 40. For example, the management computer 20 sets an encrypted state of data stored in a virtual volume (validating/invalidating encryption), based on operation by the storage administrator.

More specifically, as described in a process flow of this embodiment to be described later, for example, the management computer 20 is capable of sending an encryption transfer process command for encrypting a virtual volume specified by the storage administrator to the storage apparatus 10 to encrypt data already stored in the storage apparatus 10 or in the external storage apparatus 40. The management computer 20 may not be provided as an independent computer as shown in FIG. 1, but may be incorporated in the storage apparatus 10 as a component introduced into the storage system 1, for example. The management computer 20 can have an appropriate hardware configuration other than the above hardware configuration.

Above is a description of a configuration example of the storage system 1 according to one embodiment of the present invention. This configuration is only exemplary, and the configuration of the storage system 1 of the present invention is not limited to the configuration that has been described above with the accompanying drawings.

<Management Table>

Configurations of various management tables used in a data encryption control method executed by the storage system 1 of the present embodiment will be described. Symbol "#" in each of the tables is a symbol representing number.

(Parity Group Management Table 1141)

FIG. 6 is a diagram showing a configuration example of the parity group management table 1141. The parity group management table 1141 is a table for managing the configuration of a parity group.

As shown in FIG. 6, each of the entries of the parity group management table 1141 includes a parity group number column 11411, a disk number column 11412, a RAID level column 11413, an encryption attribute column 11414, an encryption key column 11415, and an encryption method column 11416. "Parity group" is a group consisting of pieces of data that share the same parity data in a single RAID group.

The parity group number column 11411 has recorded therein a parity group identification number that is an identification code given to each parity group provided by a RAID group of the storage apparatus 10. The disk number column 11412 has recorded therein a disk number that is an identification code given to each of HDDs 121 configuring each parity group. In the example of FIG. 6, parity group 1 is configured with disks 1 to 4.

The RAID level column 11413 has recorded therein the RAID level of a RAID group configuring each parity group. In the example of FIG. 6, each parity group is configured with a RAID level of 5.

The encryption attribute column 11414 has recorded therein an encryption attribute representing performing or not performing encryption of data to be stored in each parity group. Specifically, when an encryption attribute is a "plain text", data remaining in the form of a plain text is stored in the parity group. When an encryption attribute is "cipher", data is encrypted to store the encrypted data in the parity group.

When "cipher" is recorded in the encryption attribute column 11414, the encryption key column 11415 and the encryption method column 11416 have recorded therein an encryption key and an encryption method that are used for encrypting data to be stored in the parity group, respectively. The example of FIG. 6 indicates that data encryption is set for a parity group 2, and that data is encrypted by an encryption method "AES-CBC-256" (AES-CBC method encryption algorithm with key length of 256 bits) recorded in the encryption method column 11416, using a key "0x12345678" recorded in the encryption key column 11415. An encryption algorithm, an encryption mode, key length, etc., as an encryption method are not limited to the example of FIG. 6, but may be determined in an appropriate manner.

(External Volume Group Management Table 1142)

FIG. 7 is a diagram showing a configuration example of the external volume group management table 1142. The external volume group management table 1142 is a table for managing the configuration of an external volume group, which is a storage area provided by one or more HDDs 121 incorporated in the external storage apparatus 40. Specifically, the external volume group is formed to include a logical volume provided by the external storage apparatus 40.

As shown in FIG. 7, each of the entries of the external volume group management table 1142 includes an external volume group number column 11421, a worldwide name (WWN) column 11422, a logical unit number (LUN) column 11423, an encryption attribute column 11424, an encryption key column 11425, and an encryption method column 11426.

The external volume group number column 11421 has recorded therein an external volume group number that is an identification code for identifying each external volume group. The WWN column 11422 has recorded therein a WWN that is allocated to the CHA (channel adapter) coupled to a logical volume of the external storage apparatus 40 that is linked to each external volume group.

The LUN column 11423 has recorded therein LUN that is given to a logical volume of the external storage apparatus 40 that corresponds to each external volume group. The encryption attribute column 11424, the encryption key column 11425, and the encryption method column 11426 have recorded therein information on encryption of each external volume group, and correspond to the same columns in the parity group management table 1141.

(LDEV Management Table 1143)

FIG. 8 depicts a configuration example of the LDEV management table 1143. The LDEV management table 1143 is a table for managing the configuration of an LDEV that is a logical volume created on a parity group. As shown in FIG. 8, each of the entries of the LDEV management table 1143 includes a parity group number column 11431, an LDEV number column 11432, a start address column 11433, and an end address column 11434.

The parity group number column 11431 is identical with the same parity group number column in the parity group management table 1141 of FIG. 6. The LDEV number space or column 11432 has recorded therein an LDEV number that is an identification code for identifying each of the LDEVs created on each parity group. The start address column 11433 and the end address column 11434 have recorded therein the logical block address (LBA) of the start block and the LBA of the end block of a plurality of blocks configuring the corresponding LDEV, respectively. The example of FIG. 8 indicates that each LDEV includes 200 blocks.

(External LDEV Management Table 1144)

FIG. 9 depicts a configuration example of the external LDEV management table 1144. The external LDEV management table 1144 is a table for managing the configuration of an LDEV that is a logical volume created on an external volume group. As shown in FIG. 9, each of the entries of the external LDEV management table 1144 includes an external volume group number column 11441, an LDEV number column 11442, a start address column 11443, and an end address column 11444. Items recorded in the above columns are identical with items recorded in the corresponding columns in the LDEV management table 1143 of FIG. 8.

As described above, an LDEV provided by the external storage apparatus 40 is coupled externally to the disk control unit 11 of the storage apparatus 10, and is used as a data storage area for the host computer 30 in the same manner as an LDEV provided by the HDD 121 in the storage apparatus 10.

(LU Management Table 1145)

FIG. 10 depicts a configuration example of the LU management table 1145. The LU management table 1145 is a table for managing the configuration of each LU that is a virtual volume provided to the host computer 30. As shown in FIG. 10, each of the entries of the LU management table 1145 includes a virtual volume number column 11451, a WWN column 11452, an LUN column 11453, a capacity column 11454, and a pool number column 11455. This table indicates the corresponding relation between a virtual volume recognized by the host computer 30 as a data storage area and an LDEV actually constituting the virtual volume.

The virtual volume number column 11451 has recorded therein a virtual volume number that is an identification code for identifying each virtual volume provided to the host computer 30. The WWN column 11452 has recorded therein a WWN that is allocated to the CHA used by each virtual volume for data I/O to/from the host computer 30.

The LUN space or column 11453 has recorded therein an LUN given to each virtual volume. The capacity column 11454 has recorded therein a storage capacity allocated to each virtual volume. The pool number column 11455 has recorded therein a pool number that is an identification code for identifying a pool to which a block making up each virtual volume belongs.

(Pool Management Table 1146)

FIG. 11 depicts a configuration example of the pool management table 1146. The pool management table 1146 is a table for managing the configuration of each pool. As shown in FIG. 11, each of the entries of the pool management table 1146 includes a pool number column 11461, an LDEV number column 11462, a pool capacity column 11463, a pool use ratio column 11464, an encryption attribute column 11465, and an encryption method column 11466.

The pool number column 11461 has recorded therein a pool number that is an identification code given to each pool to distinguish one pool from another. The LDEV number column 11462 has recorded therein an LDEV number that is an identification code given to each of the LDEVs making up each pool. The pool capacity column 11463 has recorded therein the size of a storage area that each pool has. The pool use ratio column 11464 contains a record of a ratio of a capacity used for data storage to the memory capacity of each pool. Based on the value of a use ratio recorded in the pool use ratio space 11464, whether a block belonging to the pool can be allocated to a virtual volume is determined. A free capacity remaining in the pool, instead of a pool use ratio, may actually be recorded in the pool use ratio column 11464.

The encryption attribute column 11465 has recorded therein an encryption attribute of an LDEV that can be registered with each pool. This means that only the LDEV formed on a parity group whose encryption attribute is "cipher" can be registered with a pool whose encryption attribute is recorded as "cipher". In contrast, only the LDEV formed on a parity group whose encryption attribute is "plain text" can be registered with a pool whose encryption attribute is recorded as "plain text".

The encryption method space 11466 has recorded therein data on an encryption method (corresponding to the same item on the parity group management table 1141 of FIG. 6) only when an encryption attribute of the pool is "cipher". This means that, for example, only the LDEV storing therein data encrypted by an encryption method identical with an encryption method recorded in the encryption method column 11466 can be registered with the pool. If "cipher" is recorded in the encryption attribute column 11465 but an encryption method is not recorded in the encryption method column 11466, registering an LDEV encrypted by an arbitrary encryption method may be allowed.

(Allocated Block Management Table 1147)

FIG. 12 depicts a configuration example of the allocated block management table 1147. The allocated block management table 1147 is a table for managing the configuration of a block allocated to each LU that is a virtual volume. As shown in FIG. 12, each entry of the allocated block management table 1147 includes an LUN column 11471, a start address column 11472, an end address column 11473, an LDEV number column 11474, a start address column 11475, and an end address column 11476.

The LUN column 11471 has recorded therein an LUN that is an identification code given to each LU. The start address column 11472 and the end address column 11473 have recorded therein an LBA representing the start block and that of an LBA representing the end block of each logical address range configuring each LU, respectively. The LDEV number column 11474 has recorded therein an LDEV number given to an LDEV including a block allocated to each LU. The start address column 11475 and the end address column 11476 contain a record of the LBA of the start block and that of the end block of blocks each allocated to each LU.

(Unallocated Block Management Table 1148)

FIG. 13 depicts a configuration example of the unallocated block management table 1148. The unallocated block management table 1148 is a table for managing the configuration of a block that is not allocated yet to an LU, i.e., a block that can be newly allocated to an LU. As shown in FIG. 13, each of entries of the unallocated block management table 1148 includes a pool number column 11481, an LDEV number column 11482, a start address column 11483, and an end address column 11484.

The pool number column 11481 has recorded therein the pool number of a pool having an unallocated LDEV, and the LDEV number column 11482 has recorded therein the LDEV number of an LDEV including an unallocated block. The start address column 11483 and the end address column 11484 has recorded therein the LBA of the start block and that of the end block of blocks not allocated yet to an LU among blocks making up each LDEV registered with a pool.

(Scheduled-to-Be-Deleted Block Management Table 1149)

FIG. 14 depicts a configuration example of the scheduled-to-be-deleted block management table 1149. The scheduled-to-be-deleted block management table 1149 is a table for managing the configuration of a scheduled-to-be-deleted block that is a block already released from allocation to an LU to maintain storage data to be deleted. As shown in FIG. 14, each of entries of the scheduled-to-be-deleted block management table 1149 includes a pool number column 11491, an LDEV number column 11492, a start address column 11493, and an end address column 11494.

The pool number column 11491, the LDEV number column 11492, the start address column 11493, and the end address column 11494 each has recorded therein the pool number of a pool having a block that is already released from allocation to an LU to maintain storage data to be deleted, an LDEV number, the LBA of the start block of the above blocks, and the LBA of the end block of the above blocks, respectively.

<General Outline of Encryption Control Process in the Present Embodiment>

An example of a data encryption control process (virtual volume encryption control process) carried out by the storage system 1 of the present embodiment will now be described referring to FIGS. 15A to 15C. The relation between a virtual volume and a pool will be described before the description of the encryption control process.

Figure 16:
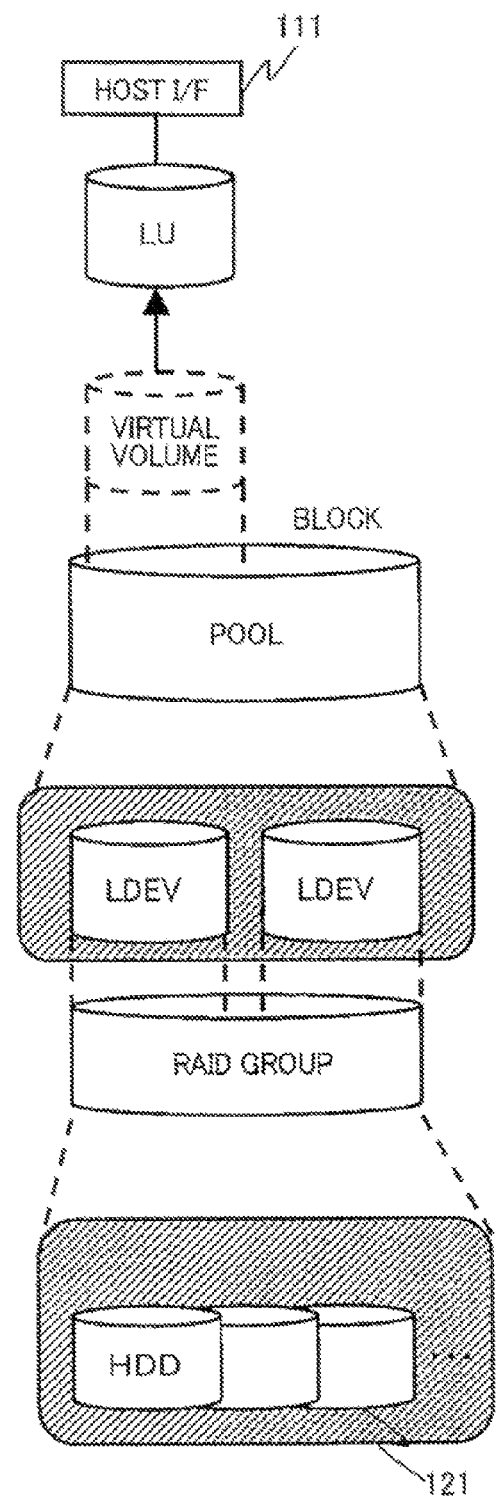
FIG. 16 is a diagram showing the relation between a physical storage area and a virtual storage area.

As described above, a virtual volume is a virtual logical volume that is provided to the host computer 30 as a data storage area. A pool area is a group of LDEVs each functioning as a unit logical storage area, and is configured with a multiplicity of blocks. FIG. 16 diagrammatically depicts the relation between a physical storage area, an LDEV, and a virtual volume (virtual storage area.)

When the storage apparatus 10 receives a request to write data to a virtual volume from the host computer 30 and a need to newly store data in the virtual volume arises, the control program 1141 allocates an unallocated block included in a pool area to the virtual volume, and newly stores data on the write request in the block allocated to the virtual volume. The corresponding relation between a block allocation destination (range of LBA of each LU) and a block allocation source (range of LBA of each LDEV) is managed on the allocated block management table 1147.

Whether data stored in a virtual volume is to be encrypted or not is determined by an encryption attribute that is set on a pool linked to the virtual volume. Specifically, when data is stored in a virtual volume linked to a pool with an encryption attribute "cipher" recorded in the encryption attribute column 11465 on the pool management table 1146, the data to be written in is encrypted. When data is stored in a virtual volume linked to a pool with an encryption attribute "plain text" recorded on the table, the data is stored in the form of plain text without being encrypted.

Presume a case where a virtual volume already containing some plain text data is encrypted when determining whether or not encryption is to be performed. Also, presume the data is encrypted not in units of virtual volumes recognized by the host computer 30, but in units of logical storage areas, such as in units of pools, which are recognized by the storage apparatus 10. In this case, it is necessary to encrypt data in all virtual volumes that share the same pool providing a block to the virtual volume to be encrypted. This results in encrypting data that does not need to be encrypted, thus putting unnecessary load on the storage system 1.

Figure 15A:
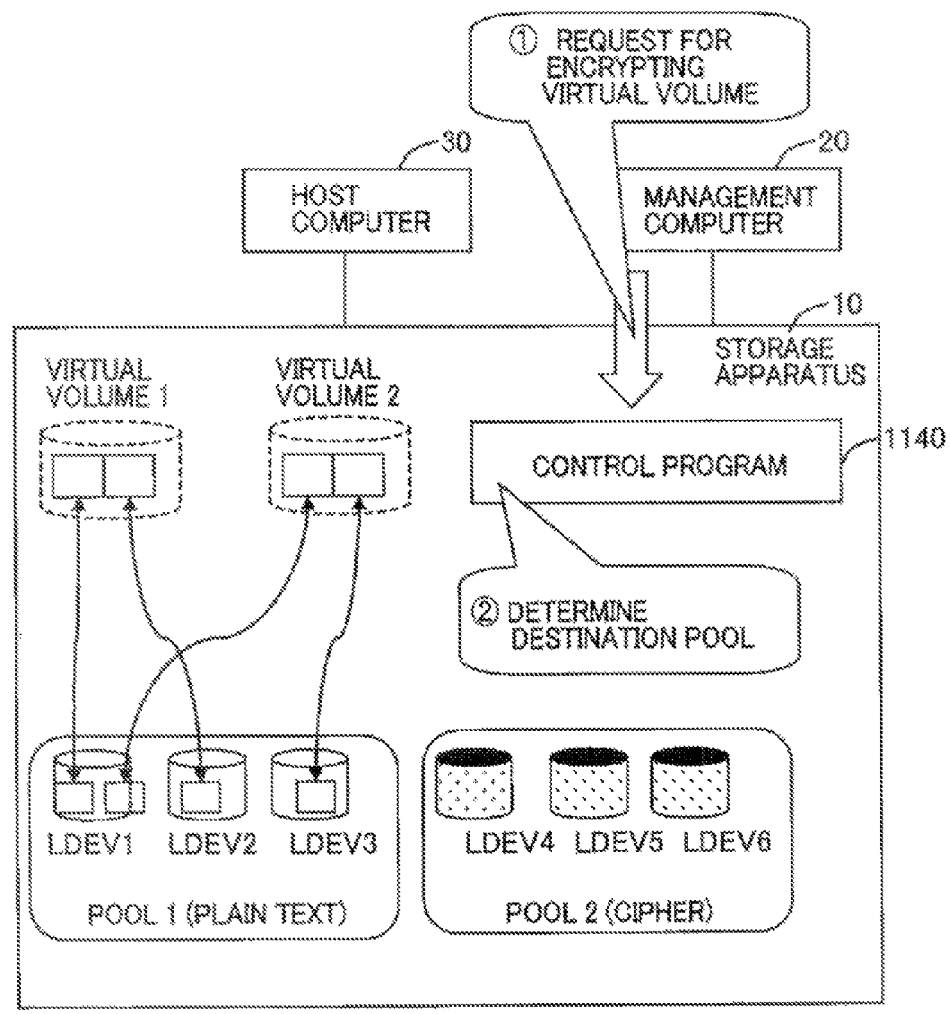
FIGS. 15A, 15B and 15C are diagrams for explaining a general outline of a virtual volume encryption conversion process.
Figure 15B:
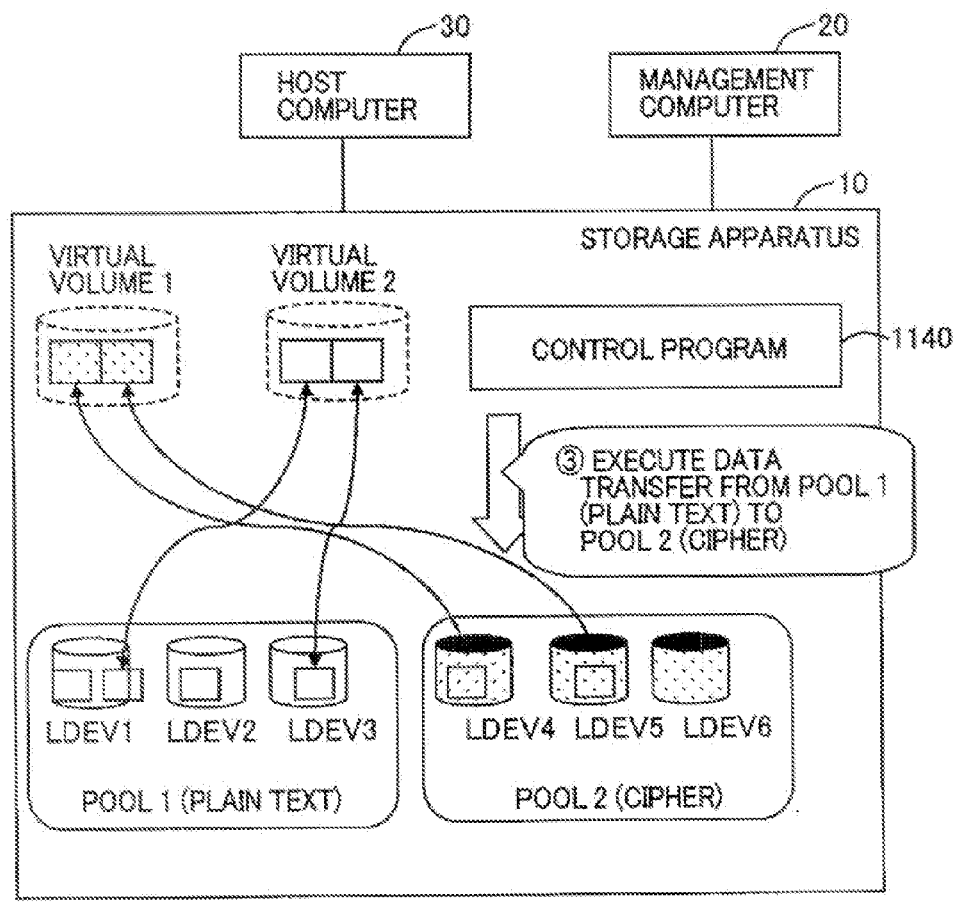
Figure 15C:
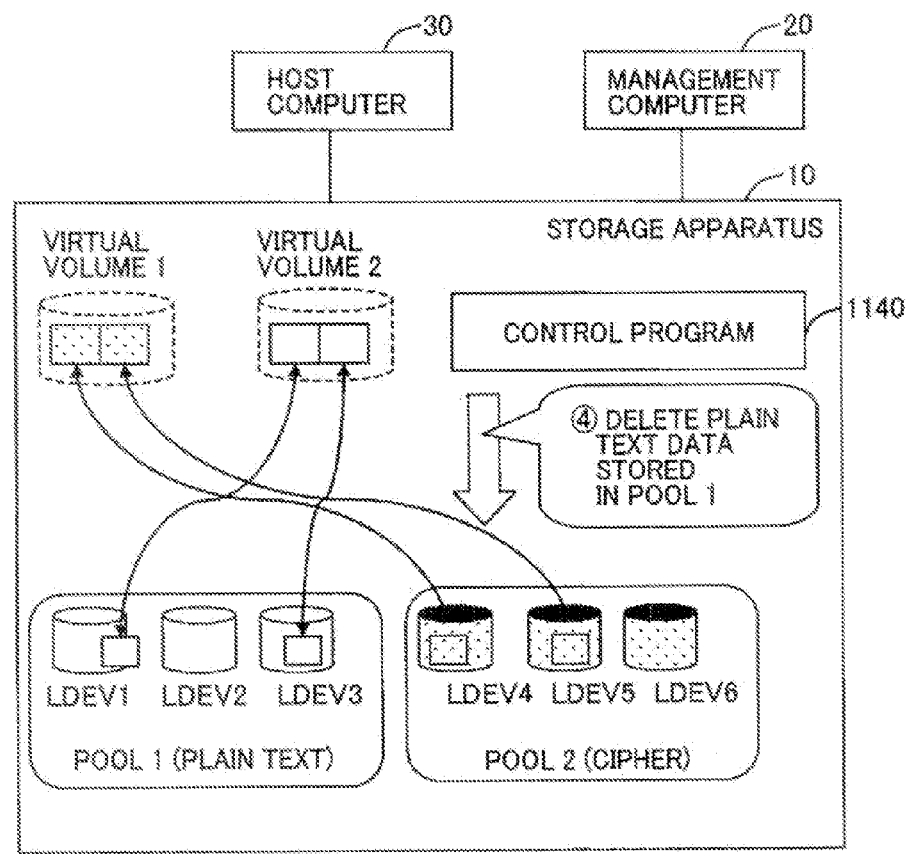

FIGS. 15A to 15C schematically depict a process of this embodiment of encrypting only the data stored in a specific virtual volume. FIGS. 15A to 15C depict examples of encrypting only the data stored in a virtual volume 1.

As shown in FIG. 15A, when the storage apparatus 10 receives a command to encrypt data stored in the virtual volume 1 from the management computer 20, the control program 1140 stored in the SM 114 of the disk control unit 11 of the storage apparatus 10 is executed to retrieve a pool meeting a encryption condition among pools managed by the storage apparatus 10. When the presence of the pool is judged, the pool is determined to be a data destination pool.

As shown in FIG. 15B, the control program 1140 is executed to read data from the virtual volume 1 that is stored in a pool 1. The data read is encrypted by the encryption/decryption control part 11404 of the control program 1140, and the encrypted data is then stored in the transfer target pool by the data transfer processing part 11407. The above data encryption and transfer process is carried out by the control program 1140 on all blocks allocated to the virtual volume 1.

Finally, as shown in FIG. 15C, plain text data allocated to the virtual volume 1 that is stored in the pool 1 is deleted, and a block from which the data is deleted is released as an unallocated block.

<Data Encryption Control Process Flow of This Embodiment>

An example of a process flow that is executed when the storage apparatus 10 receives a data encryption instruction for a specific virtual volume from the management computer 20 will now be described referring to FIG. 17. This process flow is carried out as the CPU 112 of the disk control unit 11 executes the control program 1140 stored in the SM 114 in the disk control unit 11 of the storage apparatus 10. A process executed mainly by the control program 1140 or a function unit included therein is realized as the CPU 112 executes the control program 1140. In the following process flow, the character "S" denotes step.

The control program 1140 of the storage apparatus 10 receives an encryption instruction from the management computer 20 (S171). An encryption condition includes items such as an encryption algorithm to be used, an encryption method including key length, etc., and specification on whether encrypted data is to be stored in an LDEV of the storage apparatus 10 or in an LDEV of the external storage apparatus 40. The encryption/decryption control part 11404 of the control program 1140 acquires the encryption condition from the received encryption instruction.

The control program 1140 then refers to the pool management table 1146, and retrieves a pool that secures a memory capacity necessary for storing encrypted data and that meets the encryption condition, from pools with the encryption attribute 11465 set as "cipher" (S172).

The encryption/decryption control part 11404 of the control program 1140 judges whether a pool meeting the encryption condition is present, based on records in the pool use ratio column 11464, the encryption attribute column 11465, and the encryption method column 11466 of the pool management table 1146 (S173). When the presence of a pool meeting the encryption condition is judged (S173: Yes), a data transfer process at S178 is executed to end the process flow. The data transfer process at S178 will be described later with reference to FIG. 18.

When a pool meeting the encryption condition is not present at S173 (S173: No), the encryption/decryption control part 11404 refers to the parity group management table 1141, the external volume group management table 1142, the LDEV management table 1143, and the external LDEV management table 1144, and retrieves a parity group or an external volume group on which an LDEV is not created (S174).

The encryption/decryption control part 11404 checks to see if a parity group or an external volume group not registered in the LDEV management table 1143 or the external LDEV management table 1144 is present, and determines whether a parity group or an external volume group on which an LDEV is not created is present (S175).

When judging that a parity group or an external volume group on which an LDEV is not created is present (S175: Yes), the encryption/decryption control part 11404 creates LDEVs formatted for encrypted (S176), and configures a pool composed of the created LDEVs (S177). The data transfer process at S178 is then executed in the same manner as in the case of Yes at S173 to end the process flow.

When judging that a parity group or an external volume group on which an LDEV is not created is not present (S175: No), the encryption/decryption control part 11404 transmits information such as an error notice (S179) indicative of the incapability of encrypting a virtual volume to be encrypted according to the encryption instruction from the management computer 20 under the specified condition, to the management computer 20, after which the process flow ends.

According to the above configuration, an encrypted state of stored data can be changed in virtual volumes used by the host computer 30 without changing the encrypted state of stored data in units of parity groups or in units of external volume groups.

Even if a pool matching an encryption condition is not present, a pool matching a desired encryption condition can be configured from a parity group or an external volume group.

An example of a detailed process flow of a data transfer process step (S178) in the process flow of FIG. 17 will now be described referring to FIGS. 18A and 18B.

The encryption/decryption control part 11404 of the control program 1140 judges whether encryption has been completed for all blocks allocated to a to-be-encrypted virtual volume (S1801). When judging that encryption has not been completed (S1801: No), the encryption/decryption control part 11404 refers to the allocation block management table 1147 to acquire the LDEV number 11474 of an LDEV having a block allocated to the LUN 11471 of the to-be-encrypted virtual volume and the start address 11475 and end address 11476 of the block (S1802).

Figure 17:
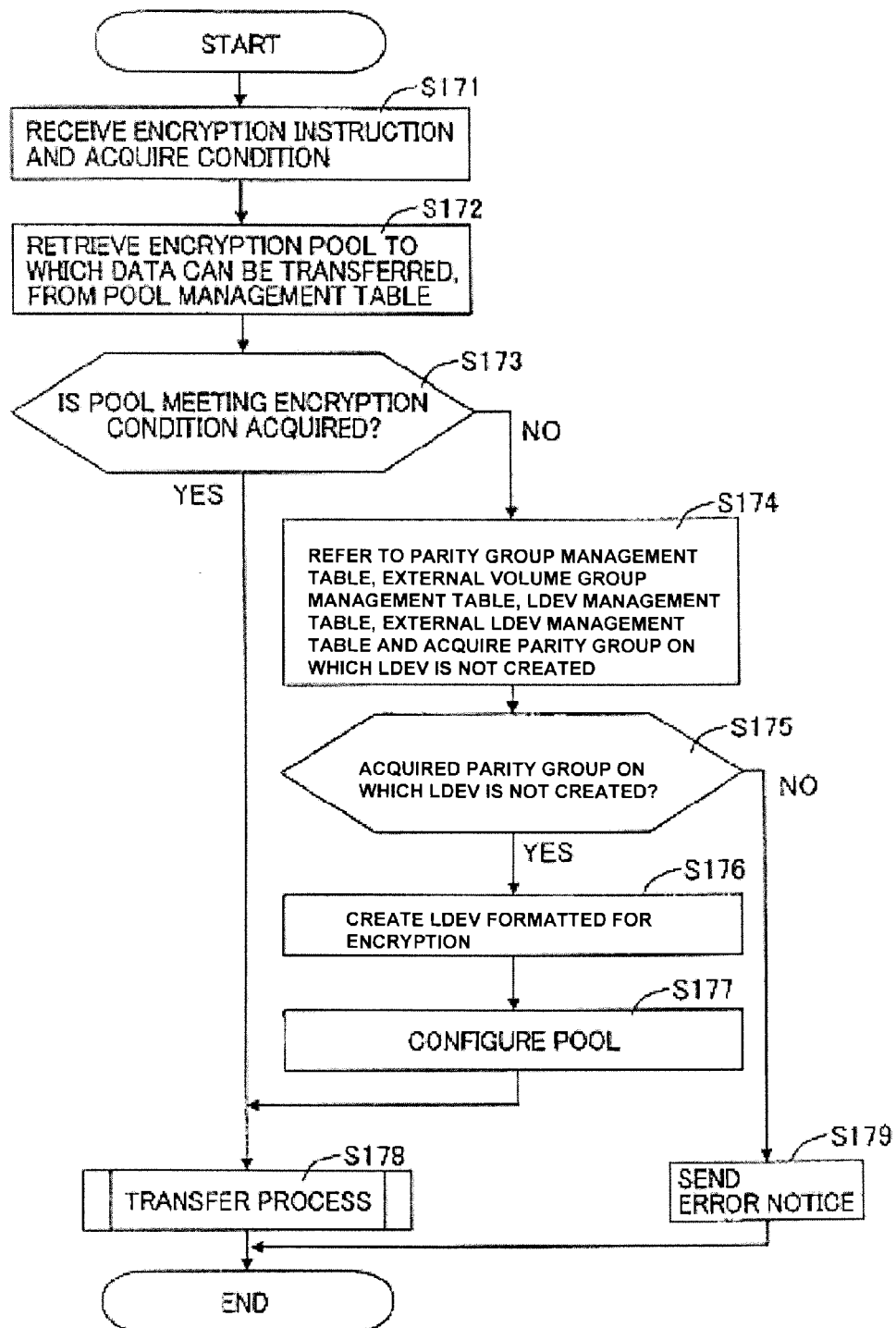
FIG. 17 is an example of a flowchart for explaining a process that is executed when the storage system according to one embodiment of the present invention receives an encryption instruction.
Figure 18A:
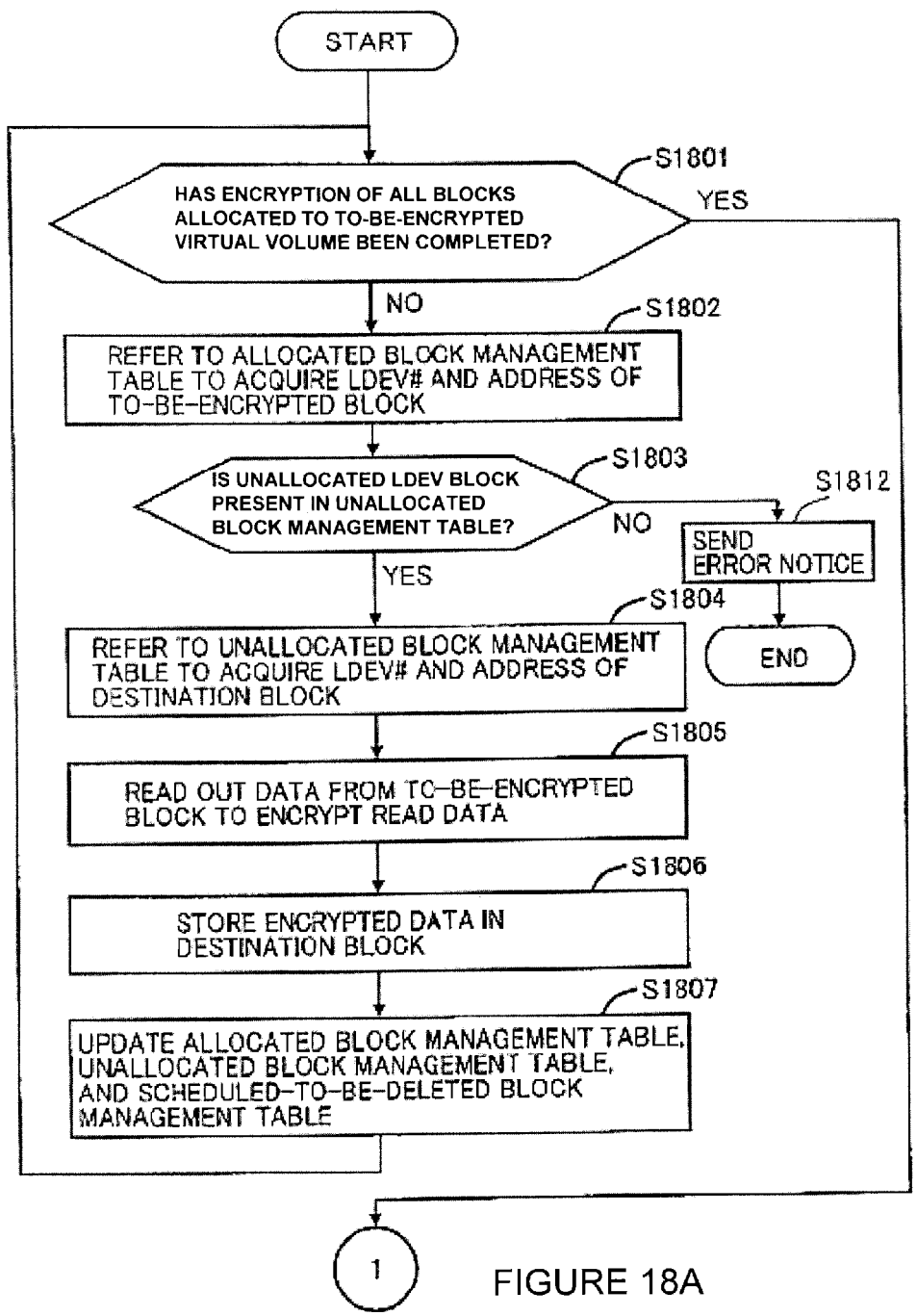
FIG. 18A is an example of a flowchart for explaining an encrypted data transfer process that is executed by the storage system according to one embodiment of the present invention.
Figure 18B:
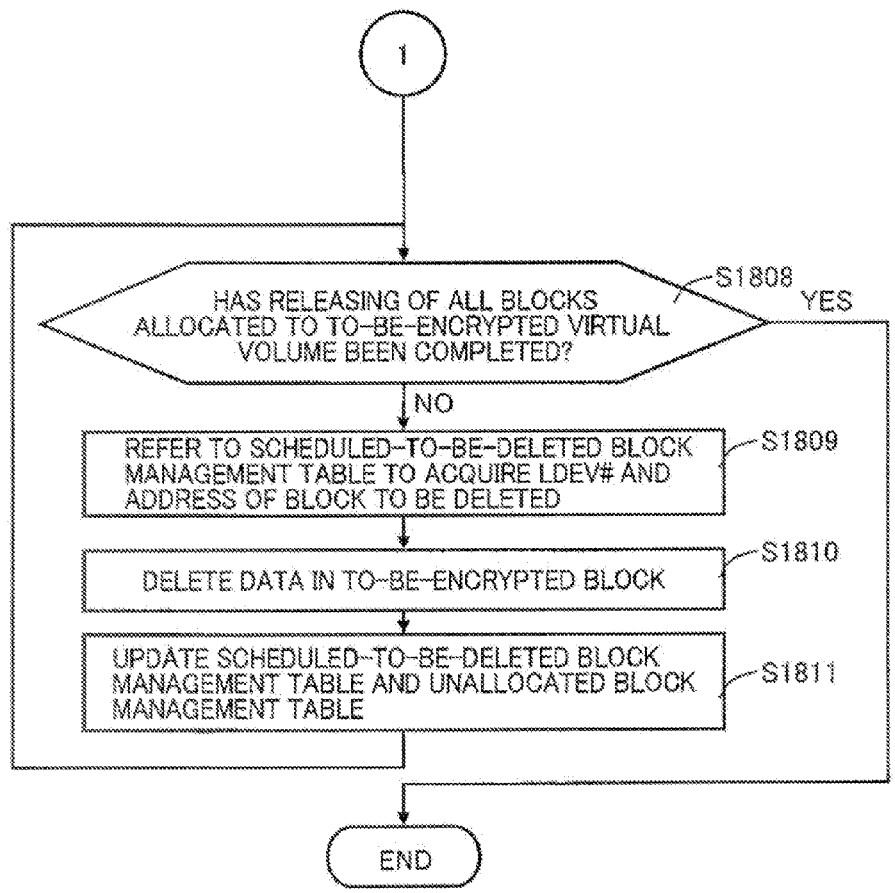
FIG. 18B is an example of a flowchart for explaining the encrypted data transfer process that is executed by the storage system according to one embodiment of the present invention, showing a flowchart following the flowchart of FIG. 18A.

The encryption/decryption control part 11404 of the control program 1140 then refers to the unallocated block management table 1148 to judge whether an LDEV which has a block not allocated to any virtual volume is present in an encrypted data storage destination pool judged at S173 or S177 in the process flow of FIG. 17 (S1803). When judging that the LDEV is present (S1803: Yes), the encryption/decryption control part 11404 acquires the LDEV number 11482 of the LDEV and the start address 11483 and the end address 11484 of the destination block (S1804).

When judging that an LDEV having a block not allocated to any virtual volume is not present (S1803: No), the encryption/decryption control part 11404, for example, sends an error notice through the management computer 20 to end the process flow (S1812).

The encryption/decryption control part 11404 of the control program 1140 then reads out stored data from the block specified by the LDEV number 11474, the start address 11475, and the end address 11476 that are acquired at step S1802, and encrypts the read data (S1805).

The encryption/decryption control part 11404 of the control program 1140 then stores the encrypted data in the block specified by the LDEV number 11482, the start address 11483, and the end address 11484 that are acquired at step S1803 (S1806).

The data transfer processing part 11407 of the control program 1140 then registers the LDEV number 11474 and the start address 11475 and end address 11476 of the block acquired at S1802, to the scheduled-to-be-deleted block management table 1149, and updates or replaces the LDEV number column 11474, the start address column 11475, and end address column 11476, to which entries of the LDEV number 11474 and the start address 11475 and end address 11476 of the block that are acquired at S1802 of the allocation block management table are registered, with the LDEV number 11482 and the start address 11483 and end address 11484 of the block that are acquired at S1803. In addition, the data transfer processing part 11407 deletes registered entries of the LDEV number 11482 and the start address 11483 and end address 11484 of the block that are acquired at S1804, from the unallocated block management table 1148 (S1807).

The above process from S1802 to S1807 is carried out repeatedly on all blocks allocated to the to-be-encrypted virtual volume (S1801: No). When the process of these steps on all blocks is judged to have completed (S1801: Yes), the process flow proceeds to step S1808 (FIG. 18B).

The data transfer processing part 11407 of the control program 1140 judges whether releasing of all blocks allocated to the to-be-encrypted virtual volume has been completed (S1808). When judging that releasing of all blocks has not been completed (S1808: No), that is, when referring to the scheduled-to-be-deleted block management table 1149 to judge that an entry remains on the scheduled-to-be-deleted block management table 1149, the data transfer processing part 11407 acquires the LDEV number 11492, the start address 11493, and the end address 11494 of a block required to be deleted (S1809).

The data transfer processing part 11407 then deletes data stored in the block specified by the LDEV number, the start address, and the end address that are acquired at S1809 (S1810).

The data transfer processing part 11407 then updates the registered entry of the LDEV number, the start address, and the end address that are acquired at S1809 from the scheduled-to-be-deleted block management table 1149, and updates the LDEV number, the start address, and the end address that are acquired at S1809 in the unallocated block management table 1148 (S1811).

The process from S1808 to S1811 is carried out repeatedly on all blocks allocated to the to-be-encrypted virtual volume (S1808: No). When the completion of the process of these steps on all blocks is judged (S1808: Yes), the process flow comes to an end.

The above configuration allows securing data safety by complete deletion of the plain text data and the effective use of a block from which data is deleted as a storage area for other data.

<User Interface of Management Computer 20>

Figure 19B:
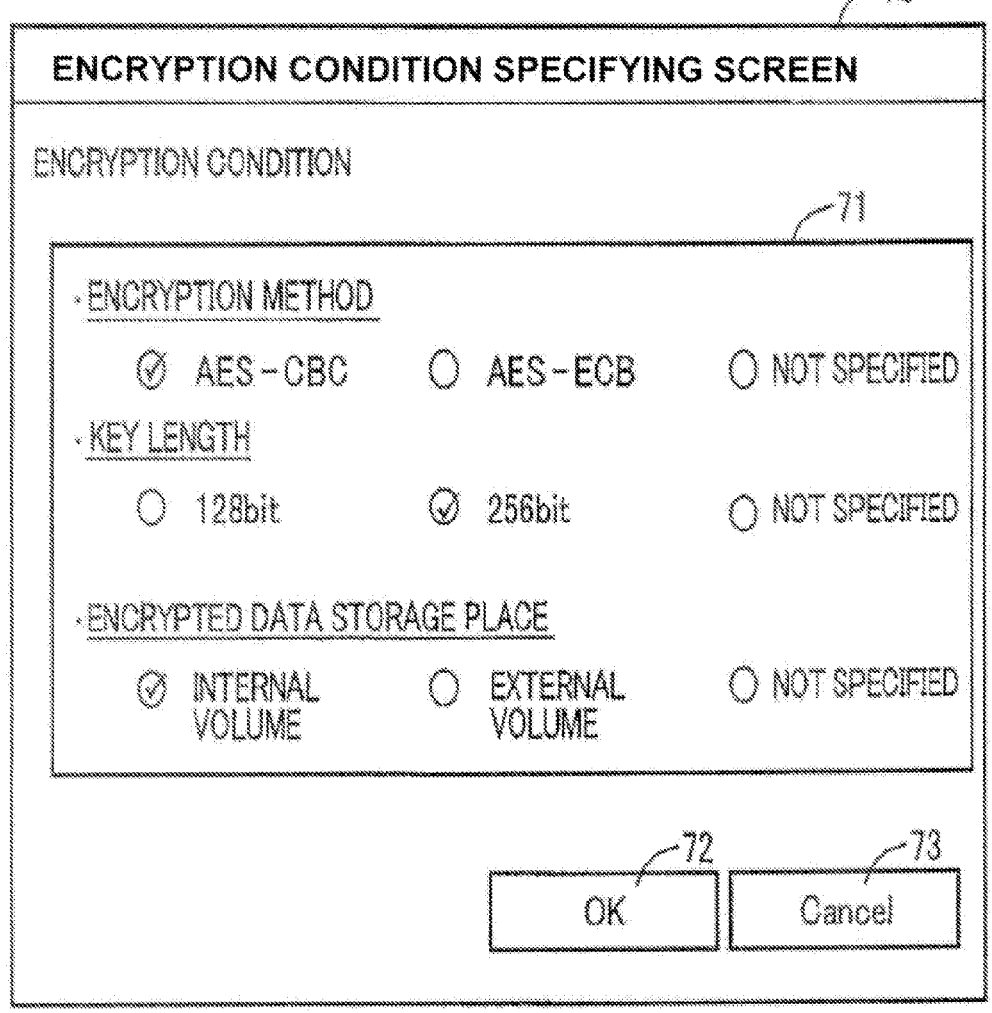
FIG. 19B is a diagram of another example of a management screen that can be displayed on the management computer.
Figure 19C:
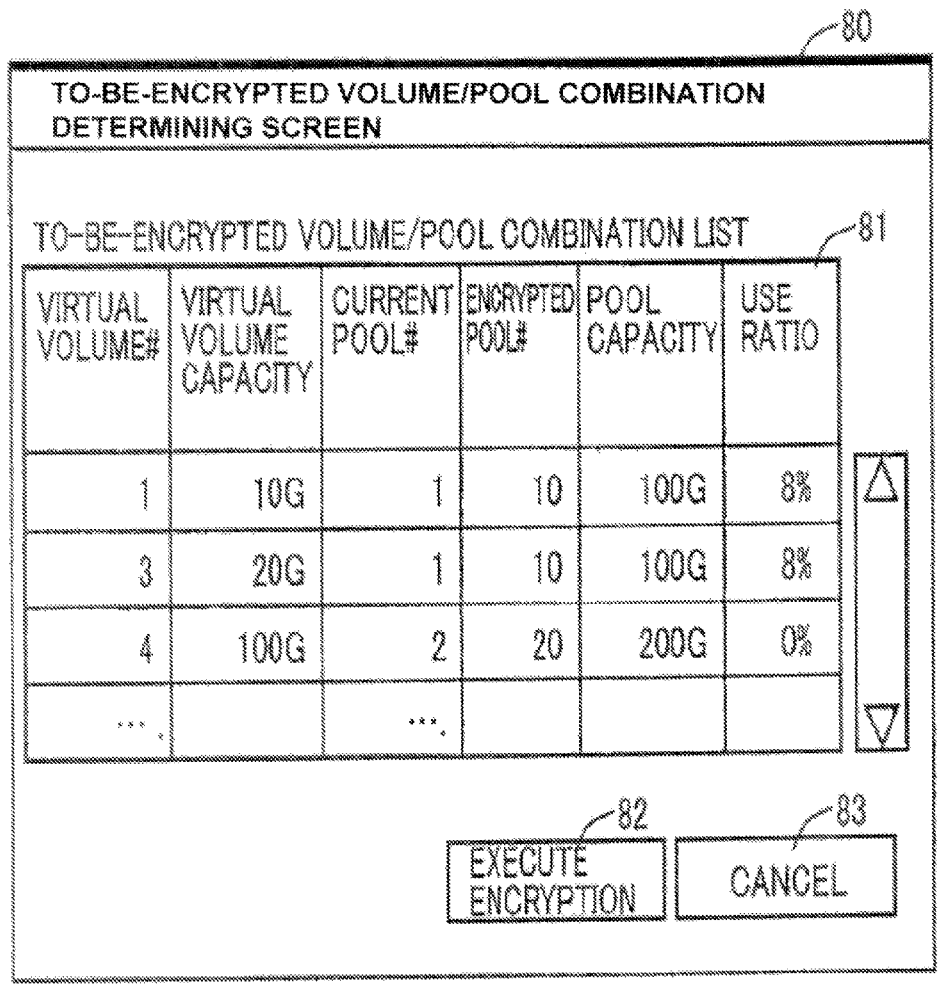
FIG. 19C is a diagram of yet another example of a management screen that can be displayed on the management computer.

A management screen serving as a user interface that can be displayed on the output device 1005 of the management computer 20 of FIG. 1 will now be described. FIGS. 19A to 19C are diagrams of display examples of a user interface (screen display) that is used by an administrator of the storage system 1 of this embodiment to transmit an encryption command to a virtual volume of the storage apparatus 10 from the management computer 20. These user interface screens are displayed, for example, on the output device 1005 that is a liquid crystal monitor as the management program 201 of the management computer 20 is executed by the CPU 1001.

FIG. 19A is a diagram of a display example of a to-be-encrypted volume selection screen 60 for specifying a virtual volume (LU) to be encrypted.

A plain text volume list 61 is displayed on the to-be-encrypted volume selection screen 60. The plain text volume list 61 includes, for example, a virtual volume number that is an identification code for a virtual volume recognized by the host management computer 30, the storage capacity of the virtual volume, the pool number of a pool corresponding to the virtual volume, the current encryption attribute of the virtual volume, and a check box for selecting a to-be-encrypted virtual volume.

The plain text volume list 61 displays a list of virtual volumes linked to a pool with an encryption attribute of plain text out of virtual volumes provided by the storage apparatus 10.

When encrypting data stored in a virtual volume, the storage administrator selects a virtual volume to be encrypted from the list 61 using the check box, and clicks an OK button 62. A cancel button 63 is operated when a selection process on the screen is to be canceled.

FIG. 19B is a diagram of a display example of an encryption condition specifying screen 70 that is displayed when the OK button 62 is operated on the to-be-encrypted volume setting screen 60 of FIG. 19A.

An encryption condition 71 is displayed on the encryption condition specifying screen 70. The encryption condition 71 enables the administrator to specify a condition for encryption including an encryption method, a key length, and an encrypted data storage area that are applied when a virtual volume specified on the to-be-encrypted volume setting screen 60 is encrypted. The storage administrator specifies the encryption condition on the encryption condition specifying screen 71, and clicks an OK button 72. A cancel button 73 is operated when a specifying process on the screen is to be canceled.

FIG. 19C is a diagram of a display example of a to-be-encrypted volume/pool combination determining screen 80 that is displayed when the OK button 72 is clicked on the encrypted condition specifying screen 70. A to-be-encrypted volume/pool combination list 81 is displayed on the to-be-encrypted volume/pool combination determining screen 80.

The to-be-encrypted volume/pool combination list 81 displays combinations of virtual volumes that are selected by the storage administrator to be encrypted on the to-be-encrypted volume setting screen 60 and pools meeting an encryption condition that are specified on the encryption condition specifying screen 70. In the example of FIG. 19C, the list 81 displays the virtual volume number of a selected virtual volume, the capacity of the virtual volume, and the pool number of a pool currently linked to the virtual volume, together with the pool number of a pool linked to the virtual volume after encryption, the storage capacity of the post-encryption pool, and the capacity use ratio of the post-encryption pool.

The storage administrator checks a combination of a to-be-encrypted volume and a post-encryption pool, and clicks an encryption execution button 82 when determining the combination to be appropriate. As a result, an encryption process command is transmitted from the management computer 20 to the disk control unit 11 of the storage apparatus 10, which starts the control program 1140 of the SM 114 to execute encryption of a to-be-encrypted virtual volume.

When the storage administrator determines that an appropriate combination is not displayed, the storage administrator may be allowed to set a combination of a to-be-encrypted volume and a pool through manual input on the screen 80. When a plurality of candidates of pools to be combined with a single to-be-encrypted virtual volume are retrieved, the storage administrator may be allowed to select a pool determined by the administrator to be appropriate out of the candidates of pools.

According to the embodiment as described above, only the data stored in a specific virtual volume can selectively be encrypted. While only the case of encrypting plain text data is described in this embodiment, the configuration described in this embodiment applies not only to the case of encrypting plain text data, but also to a case of decrypting encrypted data and to a case of changing an encryption key to encrypted data. Data storage states may be classified in virtual volumes in accordance with an appropriate attribute other than data encryption.

The invention claimed is:

1. A storage system comprising a storage apparatus having a storage control unit communicatively coupled to an external apparatus, the storage control unit configured to form a plurality of virtual storage areas, each virtual storage area serving as a unit storage area used by the external apparatus as a data storing area and being formed using a unit logical storage area selected among a plurality of unit logical storage areas provided by a physical storage medium;

the storage control unit configured to link each of the virtual storage areas to any one of a plurality of attributes, each attribute representing a storage state of data stored in a corresponding one of the virtual storage areas, wherein the storage control unit includes a logical storage area management unit configured to manage and maintain the link of each of the virtual storage areas and any one of the attributes to each of logical storage area groups, each logical storage area group configured to include a respective one of the unit logical storage areas, wherein the logical storage area management unit, when receiving a command to change an attribute of any one of the virtual storage areas to a different attribute, is configured to determine presence or absence of a unit logical storage area that belongs to a logical storage area group linked to the different attribute and that is not yet allocated to any one of the virtual storage areas, and when determining the presence of a unit logical storage area that is not yet allocated to any one of the virtual storage areas, the logical storage area management unit is configured to link a unit logical storage area determined to be present to a corresponding one of the virtual storage areas, read out data stored in a unit logical storage area linked to a virtual storage area subjected to an attribute change, and store the read data in the unit logical storage area determined to be present in accordance with a storage state represented by the different attribute, wherein the physical storage medium includes a plurality of physical disks, wherein the plurality of attributes includes an encryption attribute representing encryption of the data to be stored in a respective one of the unit storage areas, and a plain text attribute representing storage data to be stored in a form of plain text data, wherein the storage control unit configures a parity group as a RAID group organized with the physical disks, and keeps a corresponding relation between each parity group and a respective one of the unit logical storage areas and any one of the attributes, and wherein the logical storage area management unit is configured to maintain, using management tables, a corresponding relation between the unit logical storage areas, each pool area, and the attributes, the logical storage area management unit comprising:

an encryption/decryption control part that when receiving a command to change an attribute of one of the virtual storage areas, is configured to judge presence or absence of a pool area linked to the changed attribute, and that when judging the presence of a pool area, is configured to judge presence or absence of a unit storage area linked to the pool area judged to be present; and a data transfer processing part that when judging the presence of the unit storage area linked to the pool area judged to be present, is configured to link the unit storage area judged to be present to the virtual storage area subjected to the attribute change, to read out data stored in the unit logical storage area linked to the virtual storage area subjected to the attribute change, and to store the read data in the unit logical storage area judged to be present in accordance with a storage state represented by the different attribute, the data transfer processing part configured to judge presence or absence of a parity group not linked to the unit logical storage area judged to be present when judging the absence of a pool area linked to the changed attribute, and to newly create a pool area using the unit storage area judged to be present included in the parity group not linked to the unit logical storage area judged to be present to execute an attribute change process when the presence of the pool area linked to the changed attribute is judged.

2. The storage system of claim 1, further comprising an external storage apparatus that includes a physical storage medium to provide a plurality of unit logical storage areas, wherein the storage control unit of the storage apparatus is communicatively coupled to the external storage apparatus, is configured to link any one of the attributes to each of the logical storage area groups including a unit storage area of the external storage apparatus to maintain the link of the one of the attributes, and is configured to provide one of the unit logical storage areas provided by the external storage apparatus to the external apparatus.

3. The storage system of claim 1, wherein
when the attribute change is carried out, the logical storage area management unit is configured to cancel a corresponding link between the unit logical storage area having been linked to an attribute before the attribute change and the virtual storage area subjected to the attribute change, delete the data stored in the unit logical storage area in which the corresponding link has been canceled, and link the unit storage area in which the corresponding link has been canceled to the logical storage area group linked to an attribute before the attribute change to maintain the link.

4. The storage system of claim 1, wherein only unit storage areas formed in a parity group with an encryption attribute of cipher are registered with a pool area with an encryption attribute of cipher, and only unit storage areas formed in a parity group with an encryption attribute of plain text are registered with a pool area with an encryption attribute of plain text.

5. The storage system of claim 1, further comprising a management computer communicatively coupled to the storage apparatus, wherein
the management computer is configured to generate information for commanding the storage control unit of the storage apparatus to change an attribute of a virtual storage area, based on an input attribute change condition, and to transmit the information to the storage apparatus.

6. The storage system of claim 5, wherein
the management computer is configured to output a user interface screen for each virtual storage area, the user interface screen displaying a storage capacity of each virtual storage area, the logical storage area group linked to each virtual storage area, and any one of the attributes linked to each virtual storage area.

7. The storage system of claim 5, wherein
when encrypting data to be stored in a virtual storage area is set as an attribute, the management computer is configured to output a user interface screen for selecting an encryption method used for the encryption.

8. The storage system of claim 5, wherein
when receiving a command to change an attribute set for a virtual storage area to an encryption attribute representing encrypting of data to be stored in that virtual storage area, the management computer is configured to output a user interface screen for each virtual storage area provided by the storage apparatus, the user interface screen displaying at least a storage capacity of each virtual storage area, the logical storage area group linked to each virtual storage area, and the logical storage area group to which each virtual storage area is to be linked when an encryption attribute is set for each virtual storage area.

9. A method of operating a storage system comprising a storage apparatus having a storage control unit communicatively coupled to an external apparatus, said method comprising:
forming a plurality of virtual storage areas, each virtual storage area serving as a unit storage area used by the external apparatus as a data storing area and being formed using a unit logical storage area selected among a plurality of unit logical storage areas provided by a physical storage medium;
linking each of the virtual storage areas to any one of a plurality of attributes, each attribute representing a stored state of data stored in a corresponding one of the virtual storage areas,
managing and maintaining, via a logical storage area management unit of the storage control unit, the links of each of the virtual storage areas and any one of the attributes to each of a plurality of logical storage area groups, each logical storage area group being a logical storage area including a respective one of the unit logical storage areas, wherein
the logical storage area management unit
when receiving a command to change an attribute of any one of the virtual storage areas to a different attribute, determines presence or absence of a unit logical storage area that belongs to a logical storage area group linked to the different attribute and that is not yet allocated to any one of the virtual storage areas, and wherein
when determining the presence of a unit logical storage area that is not yet allocated to any one of the virtual storage areas, the logical storage area management unit links a unit logical storage area determined to be present to a corresponding one of the virtual storage areas, reads out data stored in a unit logical storage area linked to a virtual storage area subjected to an attribute change, and stores the read data in the unit logical storage area determined to be present in accordance with a storage state represented by the different attribute,
wherein the physical storage medium includes a plurality of physical disks, wherein the plurality of attributes includes an encryption attribute representing encryption of the data to be stored in a respective one of the unit storage areas, and a plain text attribute representing storage of the data to be stored in a form of plain text data,
said method further comprising
configuring, via the storage control unit, a parity group as a RAID group organized with the physical disks, and keeping a corresponding relation between each parity group and a respective one of the unit logical storage areas and any one of the attributes, and
maintaining, via the logical storage area management unit, using management tables, a corresponding relation between the unit logical storage areas, each pool area, and the attributes,
the logical storage area management unit comprising an encryption/decryption control part and a data transfer processing part:
the encryption/decryption control part, when receiving a command to change an attribute of one of the virtual storage areas, judging presence or absence of a pool area linked to the changed attribute, and when judging the presence of a pool area, judging presence or absence of a unit storage area linked to the pool area judged to be present; and
the data transfer processing part, when judging the presence of the unit storage area linked to the pool area judged to be present, linking the unit storage area judged to be present to the virtual storage area subjected to the attribute change, reading out data stored in the unit logical storage area linked to the virtual storage area subjected to the attribute change, and storing the read data in the unit logical storage area judged to be present in accordance with a storage state represented by the different attribute;
the data transfer processing part judging presence or absence of a parity group not linked to the unit logical storage area judged to be present when judging the absence of a pool area linked to the changed attribute, and newly creating a pool area using the unit storage area judged to be present included in the parity group not linked to the unit logical storage area judged to be present to execute an attribute change process when the presence of the pool area linked to the changed attribute is judged.

* * * * *